SNEAK CURRENT SUPPRESSOR IN MAGNETIC AMPLIFIERS

Filed Sept. 12, 1960

INVENTOR.
JOSEPH D. LAWRENCE, JR.
BY
Charles C. Englert
Agent.

United States Patent Office 3,149,237

Patented Sept. 15, 1964

3,149,237

SNEAK CURRENT SUPPRESSOR IN MAGNETIC AMPLIFIERS

Joseph D. Lawrence, Jr., Oreland, Pa., assignor to Sperry Rand Corporation, New York, N.Y., a corporation of Delaware Filed Sept. 12, 1960, Ser. No. 55,429
8 Claims. (Cl. 307—88)

Figure 1:
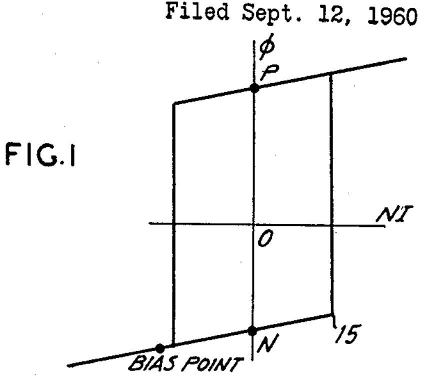

This invention relates to magnetic amplifier circuits and more in particular to circuits wherein such amplifier is used as a switch controlling flow or no flow of current through a load.

Still more in particular this invention relates to drive circuits for coincident current memories of the type found in digital computers, wherein magnetic amplifiers are used to selectively control the flow of current through the memory lines.

The control of current through a load is required in many applications. A well-known means to accomplish this is the use of a bias network. However, with the use of a bias network accurate current regulation becomes difficult if not impossible, whereas such accurate current regulation is of much importance in coincident current memories.

One form of coincident current memory may comprise a two-dimensional array of magnetic cores of the rectangular hysteresis loop type, placed at the intersection of a number of horizontal (X-drive lines) and vertical (Y-drive lines) wires. The physical arrangement of cores is usually such as to define an array made up of a plurality of rows and columns of cores. A separate wire is passed through each row of cores; likewise a separate wire is passed through each column of cores. The wires passing through the rows are referred to as X drive wires or X memory lines, while the wires passing through the columns are referred to as Y drive wires or Y memory lines. A third wire, the read-out or sensing wire may be threaded through all the cores of the array. In operation, the selection of a certain core in the array, for example for insertion of information, is accomplished by coincidentally passing currents of equal strength through both the X and Y memory lines threading the core concerned. The magnitude of the X or Y memory line current is such that it alone is less than $I_{hc}$, the coercive force current of the memory core, but is at least equal to ½ $I_{hc}$. Thus, only the one core located at the intersection of the coincidentally selected X and Y memory line receives a magnetomotive force of sufficient magnitude to be switched. The other cores threaded by the selected X and Y memory lines in that array are only partially disturbed.

From the above it follows that it is important that the current flowing in the selected memory lines be carefully regulated and further that no current flows through any memory line not selected, since, although such currents individually may not switch a memory core, they do deteriorate the ratio between the excitation received by the selected core and the excitation received by non-selected cores, whereby the ability of the system to discriminate between selected and non-selected cores becomes degraded. Further, since the read-out winding threads all of the cores of the array, the disturbed non-selected cores will produce spurious or "noise" voltages in the read-out winding.

Also, since the X or Y memory lines may be connected in parallel to a common current regulated source, the appearance of small leakage currents in the non-selected lines render the design of the current regulator more difficult and its operation less reliable.

It is accordingly an object of the present invention to provide a memory line drive amplifier which avoids the above difficulties.

It is another object of this invention to provide a simple blocking means to prevent flow of current through a magnetic amplifier and the load connected thereto when such current flow is not desired.

It is another object of the invention to increase the reliability of magnetic amplifier driven coincident current memories.

Figure 2:
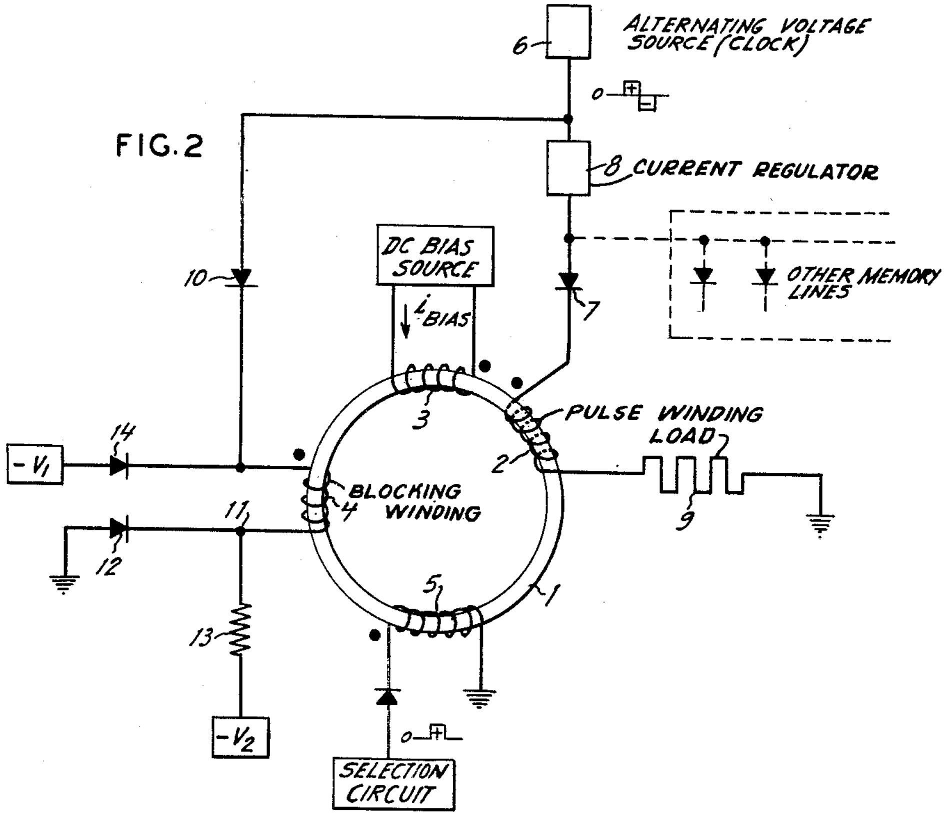

A complete understanding of this invention and of the various features thereof may be gained from consideration of the following detailed description and the accompanying drawings in which:

FIGURE 1 is an idealized graph of the hysteresis curve of a magnetic core of the type employed with the circuit of FIGURE 2; and FIGURE 2 depicts in schematic form an illustrative embodiment of this invention.

Referring now to FIGURE 1 there is shown a ferromagnetic core hysteresis loop using a rectangular coordinate system, the abscissa of which represents the ampere turns on the core whereas its ordinate represents the magnetic induction through the core. Point P represents a state of positive stable remanent magnetization while point N represents a negative stable state of magnetization. In the following, reference will be made to this graph in order to explain the operation of the preferred embodiment of this invention.

Referring to FIGURE 2 there is shown in a schematic form part of a drive circuit of a coincident current core memory system. The core 1, usually a toroid, having substantially rectangular hysteresis loop characteristics, carries the windings 2, 3, 4 and 5 wound about core 1 with their relative polarities as indicated by the dots. One terminal of winding 2 indicated as a pulse winding is connected to an alternating voltage source which is shown by pulse source 6 via a diode 7 and a magnetic current regulator 8. The current regulator 8 is preferably of the type described in my pending application Serial No. 554,988 filed December 23, 1955 now Patent No. 2,957,125. To the other terminal of the pulse winding 2 there is connected a load 9 which in this case is a memory line.

One terminal of winding 4, indicated as blocking winding, is connected to the pulse source 6 via diode 10. The other terminal of the blocking winding 4 is connected at point 11 to a current limiting circuit comprising a diode 12 and a resistor 13 arranged as shown between a point of ground potential and a point of negative potential $-V_2$. In the quiescent condition source $-V_2$ causes diode 12 to conduct and thereby hold point 11 at essentially ground potential. In the preferred embodiment of the invention the number of turns comprising the pulse winding 2 is greater than the number of turns comprising the blocking winding 4 so that the same coupling magnetic induction induces a higher voltage across the pulse winding 2 than across the blocking winding 4. The said one terminal of the blocking winding 4 is also connected to a voltage clamp circuit comprising the negative voltage source $-V_1$ and diode 14.

For the purpose of explanation, the operation of the circuit will be discussed, first for the condition where power is to be blocked from the load 9 and then where power is to be delivered to the load. In the application of the present invention to a coincident current memory and first considering the condition where 9 represents a non-selected memory line it will be assumed that due to the direction of the direct current biasing flowing through the bias winding 3, the magnetization of core 1 is that depicted by the bias point in FIGURE 1. When the positive half cycle of the clock voltage supplied by the pulse power supply 6 arrives, diodes 10 and 7 tend to conduct and current tends to flow through windings 2 and 4. The current limiting circuit comprising diode 12 and resistor 13 permits enough current to flow through winding 4 such that winding 4 acting by itself will shift the magnetization of the core from the bias point to beyond the knee 15 of the loop. In the region above point 15 a rapid flux change occurs and the pulse winding 2 has a high impedance and said positive clock current pulse will find its way to the memory line blocked. Still a small amount of current would flow through the pulse winding 2 and from there through the memory line 9 were it not for the preventive influence of the blocking winding 4. In more particular and according to this invention the positive half cycle of the clock current pulse which flows through the blocking winding 4 induces a voltage across the pulse winding 2 which since the number of turns of the pulse winding 2 is greater than that of the blocking winding 4 is greater than the clock voltage. As this voltage is of a direction opposite to the direction of the clock voltage and is greater than the clock voltage, diode 7 becomes reverse biased thereby preventing any flow of current through the pulse winding 2 and the connected memory line 9.

At the moment the clock pulse changes polarity the magnetic amplifier starts to recover under the influence of the direct current bias constantly flowing through the D.C. bias winding 3. This bias brings the core back to its initial state of negative saturation. During the recovery period a voltage is induced in windings 2 and 4 which tends to hold the diodes 7 and 10 conducting. To prevent this from occurring clamp diode 14 and clamp voltage $-V_1$ operate to limit the voltages induced in windings 2 and 4 to a value below the clock potential whereby the diodes 7 and 10 become reversed biased by the clock potential and further flow of current in these windings is blocked.

During the time that all non-selected memory lines are prevented from passing current as explained above, the memory line which is selected must receive the full regulated clock current. This is initiated by applying a select pulse to the set winding 5 of the appropriate amplifier immediately prior to the arrival of the positive half cycle of the clock pulse. The select pulse overcomes the bias presented by winding 3 and drives the magnetic amplifier in this memory line from its bias state of negative saturation to the state of positive saturation P. Consequently, the ensuing positive half cycle of the clock voltage will find the pulse winding 2 in the state of low impedance so that the clock current can flow to the memory line 9.

The current in the pulse winding 2 is limited by the current regulator 8. The part of the clock current flowing through the blocking winding 4 is, as before, limited by the current limiter arrangement of the diode 12 and the resistor 13.

When the clock changes polarity the magnetic amplifier starts to recover. The recovery time is, in the same way as explained before for the non-selected memory lines, controlled by the magnitude of the negative potential $-V_1$.

Having thus described the preferred embodiment of my invention, I claim as my invention:

1. An electrical circuit for controlling the current delivered by a pulse source to a load, including a magnetizable core, first coil means on said core serially connected between said pulse source and said load, current regulating means in series with said first coil means, current biasing means, means including an additional coil means on said core effective to control the direction and level of magnetization of the core, and third coils means on said core connected to said pulse source, and means associated with said core to selectively render ineffective the effect of said current biasing means.

2. An electrical circuit according to claim 1 wherein the number of turns of said first coil means is greater than the number of turns of said third coil means.

3. An electrical circuit for controlling the current delivered by a pulse source to a load, including a ferromagnetic core, a bias winding on said core operative to normally hold said core in one of its saturation regions, a pulse winding on said core, a diode serially connecting said pulse to said load through said pulse winding, the current delivered by said pulse source to said pulse winding tending to drive said core toward a state of magnetization opposite to the state of magnetization caused by said bias winding, a blocking winding wound on said core and connected to said pulse source, the current delivered by said pulse source to said blocking winding inducing an electromotive force in said pulse winding which effectively blocks said diode, and a control winding on said core to selectively overcome the effect of said bias winding.

4. An electrical circuit according to claim 3 wherein the number of turns of said pulse winding is greater than the number of turns of said blocking winding.

5. An electrical circuit for controlling the current delivered by a pulse source to a memory line, including a ferromagnetic core, a bias winding on said core operative to normally hold said core in one of its saturation regions, first rectifying means, a pulse winding on said core, said rectifying means, pulse winding and memory line being serially connected in the recited order, the current flowing through said pulse winding tending to drive said core toward a state of magnetization opposite to the state of magnetization caused by said bias winding, a second rectifying means, a blocking winding on said core, said second rectifying means and said blocking winding being serially connected in the recited order to said pulse source, said blocking winding inducing an electromotive force in said pulse winding which effectively blocks said first rectifying means, and a control winding on said core to selectively overcome the effect of said bias winding.

6. An electrical circuit according to claim 5 wherein the number of turns of said pulse winding is greater than the number of turns of said blocking winding.

7. An electrical circuit according to claim 5 wherein said core exhibits a substantially rectangular hysteresis loop.

8. An electrical circuit for controlling the current delivered by a pulse source to a load, including a magnetizable core, first coil means on said core serially connected between said pulse source and said load, current biasing means including an additional coil means on said core effective to control the direction and level of magnetization of said core, third coil means on said core connected to said pulse source, and means associated with said core to selectively render ineffective the effect of said current biasing means.

References Cited in the file of this patent

UNITED STATES PATENTS 2,682,632 Cohen ---------------- June 29, 1954